United States Patent
Salazar, III

(10) Patent No.: US 9,315,324 B2
(45) Date of Patent: Apr. 19, 2016

(54) VEGETABLE HARVESTER

(71) Applicant: Pedro Salazar, III, Immokalee, FL (US)

(72) Inventor: Pedro Salazar, III, Immokalee, FL (US)

(*) Notice: Subject to any disclaimer, the term of this patent is extended or adjusted under 35 U.S.C. 154(b) by 0 days.

(21) Appl. No.: 14/473,088

(22) Filed: Aug. 29, 2014

(65) Prior Publication Data

US 2014/0367223 A1    Dec. 18, 2014

Related U.S. Application Data

(63) Continuation of application No. PCT/US2013/028295, filed on Feb. 28, 2013.

(60) Provisional application No. 61/605,830, filed on Mar. 2, 2012.

(51) Int. Cl.
| | |
|---|---|
| *A01D 90/02* | (2006.01) |
| *B65G 15/22* | (2006.01) |
| *A01D 45/00* | (2006.01) |
| *A01D 46/24* | (2006.01) |
| *A01D 61/02* | (2006.01) |
| *B65G 37/00* | (2006.01) |

(52) U.S. Cl.
CPC .............. *B65G 15/22* (2013.01); *A01D 45/006* (2013.01); *A01D 46/243* (2013.01); *A01D 61/02* (2013.01); *A01D 90/02* (2013.01); *B65G 37/00* (2013.01)

(58) Field of Classification Search
CPC ... A01D 57/20; A01D 45/006; A01D 46/243; A01D 46/20; A01D 46/082; A01D 90/02
USPC .................................................. 414/309, 304
See application file for complete search history.

(56) References Cited

U.S. PATENT DOCUMENTS

| | | | | |
|---|---|---|---|---|
| 3,254,754 A * | 6/1966 | Spiller | ................. | A01D 46/243 198/311 |
| 3,592,331 A * | 7/1971 | Morgan | ............... | A01D 46/243 198/632 |
| 4,292,784 A * | 10/1981 | Abatti | .................... | A01D 67/00 414/345 |
| 4,557,368 A * | 12/1985 | Alameda | .............. | A01D 46/243 198/313 |
| 4,590,739 A * | 5/1986 | Abatti | .................... | A01D 67/00 414/343 |
| 4,616,468 A * | 10/1986 | Munoz | .................... | A01D 67/00 53/391 |
| 4,655,667 A * | 4/1987 | Plumb | .................. | A01D 46/243 180/89.12 |
| 4,662,162 A * | 5/1987 | Bettencourt | ........... | A01D 67/00 56/14.9 |
| 5,218,812 A * | 6/1993 | Ventura | ................. | B65B 25/046 198/314 |
| 5,297,665 A * | 3/1994 | Smith | ....................... | B60P 1/38 198/313 |
| 5,316,519 A * | 5/1994 | Johnson | ............... | A01D 45/006 460/142 |
| 5,599,157 A * | 2/1997 | Ellington | ............. | A01D 46/243 414/460 |
| 7,898,421 B2 * | 3/2011 | Foxx et al. | ................. | 340/572.8 |
| 2013/0191175 A1 * | 7/2013 | Miller | ...................... | G06K 5/00 705/7.15 |

* cited by examiner

*Primary Examiner* — Gene Crawford
*Assistant Examiner* — Thomas Randazzo
(74) *Attorney, Agent, or Firm* — Christopher Paradies; Paradies Law P.A.

(57) ABSTRACT

A device for harvesting vegetables comprises a bucket loader and a conveyor system. The bucket loader may include a pad, which may cushion the impact of vegetables, when transferring vegetables from a bucket to a conveyor. The conveyor may comprise transverse and longitudinal conveyor belts and/or rollers for delivering the vegetables to bins on a truck or flat bed trailer. The bucket loaders may be operatively coupled to a mechanism for raising and lowering the bucket loaders, intermittently or continuously. For example, a registration and tracking system keeps track of the number of buckets and/or amount of produce picked by a picker.

21 Claims, 10 Drawing Sheets

VEGETABLE HARVESTER

REFERENCE TO RELATED APPLICATIONS

This application is a continuation of International Application No. PCT/US2013/028295 filed Feb. 28, 2013, which claims the benefit of U.S. Provisional Patent Application No. 61/605,830 filed Mar. 2, 2012, the disclosure of which is incorporated herein by reference in its entirety.

FIELD OF INVENTION

The field of the invention relates to a vegetable harvester apparatus.

BACKGROUND OF THE INVENTION

Harvesters are known for vegetable crops that are not susceptible to bruising, such as for canning and juicing, but vegetable harvesters are known to cause bruising and to reduce the value of produce for distribution as fresh vegetables. Every day, supermarkets throw away produce that is bruised or otherwise marred by harvesting, packing and shipping of the fresh produce.

For example, the state of the art in tomato harvesting of fresh tomatoes that will be displayed for purchase in supermarkets is manual labor. Tomatoes are picked by hand, are placed in a bucket and are carried by hand to a truck or flat bed. The bucket is hoisted to the truck or flat bed and is deposited manually by the recipient into a bin or bins. This manual process is repeated for each bucket of tomatoes picked.

Other harvesters that rip or cut the vines from the ground and separate the tomatoes from the vines are used for tomatoes destined for canning, but these harvesters are not suitable and are not used for harvesting produce for display in supermarkets. These harvesters are known to cause bruising to produce that will result in unsightly marks on the vegetables.

SUMMARY OF THE INVENTION

A vegetable harvester comprises a bucket loader and conveyor system that gently moves vegetables from a bucket to a storage bin or shipping container for further processing or distribution. For example, the bucket loader raises and lowers a bucket or other container placed into the bucket loader. A registration system may be provided with the bucket loader to allow for tracking and proper crediting of the picker loading tomatoes onto the conveyor system. A video monitoring system provides for recording and monitoring of the operations of the harvester at an operator's location and/or remotely such as recording the volume and/or weight of the tomatoes or other vegetables introduced into the bucket loader. A fan and/or misting system may be mounted on the harvester to increase picker comfort during picking/loading of vegetables.

In one example, the bucket loader includes a mechanism for delaying the bucket loader at its loading position for inserting a bucket into the bucket loader. Then, the bucket loader raises the bucket until the tomatoes gently roll from the bucket onto a conveyor.

In one example, the conveyor system gently moves the tomatoes or other vegetables from the point of entry to a packing station distal from the point of entry. For example, a transverse conveyor may extend across one or more rows of vegetables, and a plurality of bucket loaders may provide a plurality of points of entry onto the conveyor. The conveyor system may include a longitudinal conveyor and a transition to move the tomatoes from the transverse conveyor to the longitudinal conveyor. The longitudinal conveyor may be extendable longitudinally in order to allow the operator to extend the conveyor along a packing truck or flat bed, where the vegetables are directed to bins or other containers for further processing or delivery.

In one example, pads are provided on portions of the conveyor system where vegetables could become bruised, such as the point of entry, the transition region and/or the exit of the longitudinal conveyor.

In one example, one or more elevational conveyors are provided that convey vegetables from the picker's level to the longitudinal conveyor. For example, an elevational conveyor may be provided forward of the harvester. A camera system and registration system may be provided at the entry point to the elevational conveyors.

The harvester may be mounted on a mobile chassis that moves under its own power, such as a chassis of a truck, tractor or bus. In one example, the harvester includes its own electrical generators for providing electric and/or pneumatic mechanisms for the conveyors and bucket loaders.

Surprisingly, the harvester doubles the productivity of pickers in the field while reducing the stress of heat, strain of lifting and fatigue. The increased productivity reduces labor necessary for picking fresh produce that will be displayed to customers while preventing additional bruising or reducing the bruising of vegetables during picking and packing of the vegetables for further processing or transport to market.

BRIEF DESCRIPTION OF THE FIGURES

The examples described and drawings rendered are illustrative and are not to be read as limiting the scope of the invention as it is defined by the appended claims.

DETAILED DESCRIPTION OF PREFERRED EMBODIMENTS OF THE INVENTION

Figure 1:
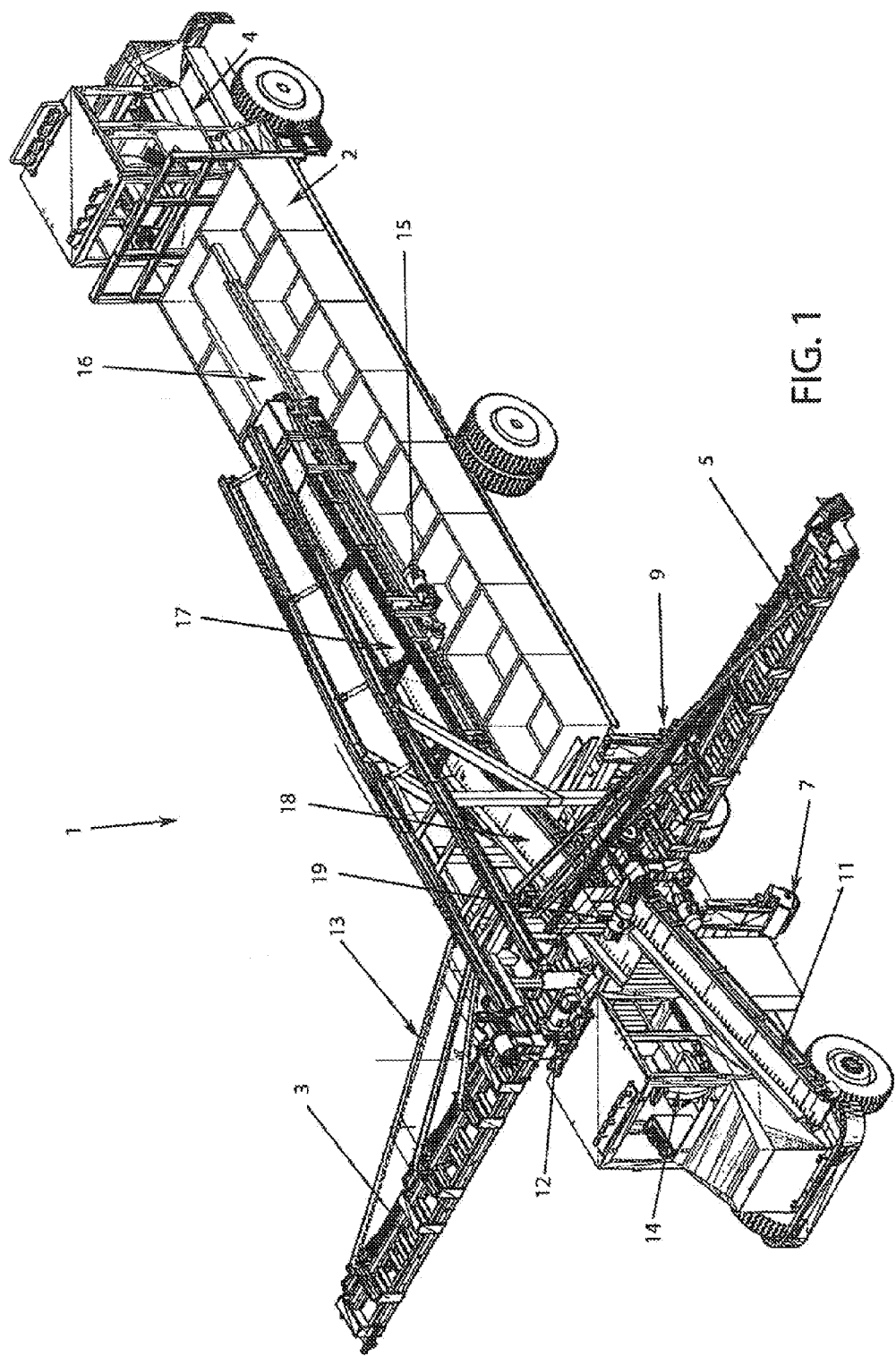
FIG. 1 illustrates an example of a harvester disposed in relation to a truck including bins for receiving vegetables such as tomatoes.

FIG. 1 illustrates an example of a harvester 1 disposed in relation to a truck 4 including bins 2 for receiving vegetables such as tomatoes. The bins are arranged on a flat bed of the truck, and a motor 15 is operationally coupled to an extendable conveyor 16 operationally mounted to a longitudinal conveyor 17 of the harvester 1. A pair of transverse conveyors 3, 5 are arranged transversely to the longitudinal conveyor 17, which transitions the direction of motion of vegetables from a transverse direction to a longitudinal direction and into the bins 2. For example, a pair of electric motors 12, 19 are operatively coupled to the transverse conveyors 3, 5 such that the conveyors operatively move the vegetables from the distal ends of the transverse conveyors toward the longitudinal conveyor. An elevational conveyor 11 may be provided for loading of vegetables forward of the harvester. A plurality of stabilizers 7, 9 may be arranged to stabilize the harvester when the transverse conveyors 3, 5 are pivotally extended as shown in FIG. 1. A plurality of tensile support members 9, 13 support the lateral conveyors 3, 5. In one example, a first portion 18 of the longitudinal conveyor 17 helps to elevate the vegetables for delivery to the bins 2. An operations center 14 may be arranged for monitoring the harvester during operation of the conveyors and bucket loaders and for driving the harvester, which may be driven under its own power.

Figure 2:
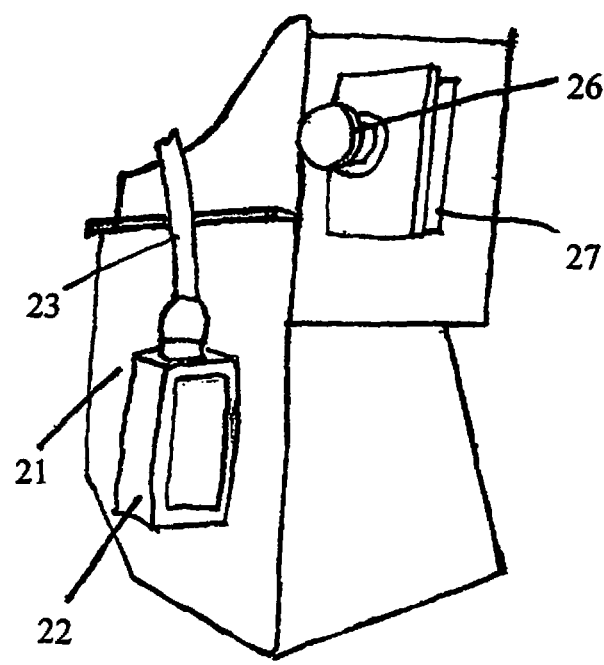
FIG. 2 illustrates a detail view of an example of radio frequency identification (RFID) device and an emergency stop switch operatively coupled with the harvester.
Figure 3:
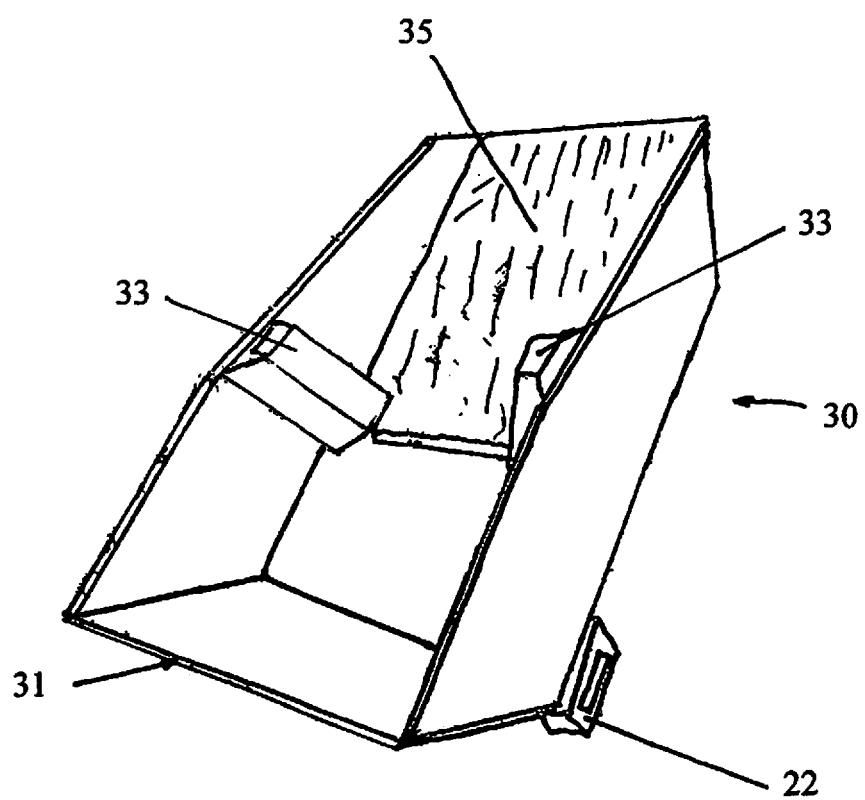
FIG. 3 illustrates a detail view of an example of a bucket loader.

FIG. 2 illustrates a detail view of an example of a radio frequency identification (RFID) device 22 for scanning identification cards of pickers and an emergency stop switch 26 and housing 27 operatively coupled with the harvester. The RFID device 22 may be arranged at each bucket loader and/or elevational conveyor for scanning RFID enabled identification devices, such as a card, for tracking and crediting a picker for produce loaded on the bucket loader and/or on an elevational conveyor. A mounting bracket 21 may be connected to the harvester at a convenient location for scanning of a picker's card when the picker places a bucket in the bucket loader, as illustrated in FIG. 3, for example, and data and power lines may be contained in a conduit 23. In the example of FIG. 3, a bucket loader 30 comprises a bottom support 31, such as a grate or rods, and sides containing a pair of bucket stops 33, which may be used for retaining the bucket with the bucket loader 30 during raising and lowering of the bucket. As the bucket is raised by the bucket loader, the vegetables will be displaced by gravity onto pad 35, which may be a resilient pad, such as a foam rubber or plastic pad, which cushions the impact of the vegetables on structural materials of the bucket loader. In one example, the bucket loader and pad is capable of preventing raw eggs from breaking as the raw eggs are dispensed from a bucket by a bucket loader, for example.

Figure 4:
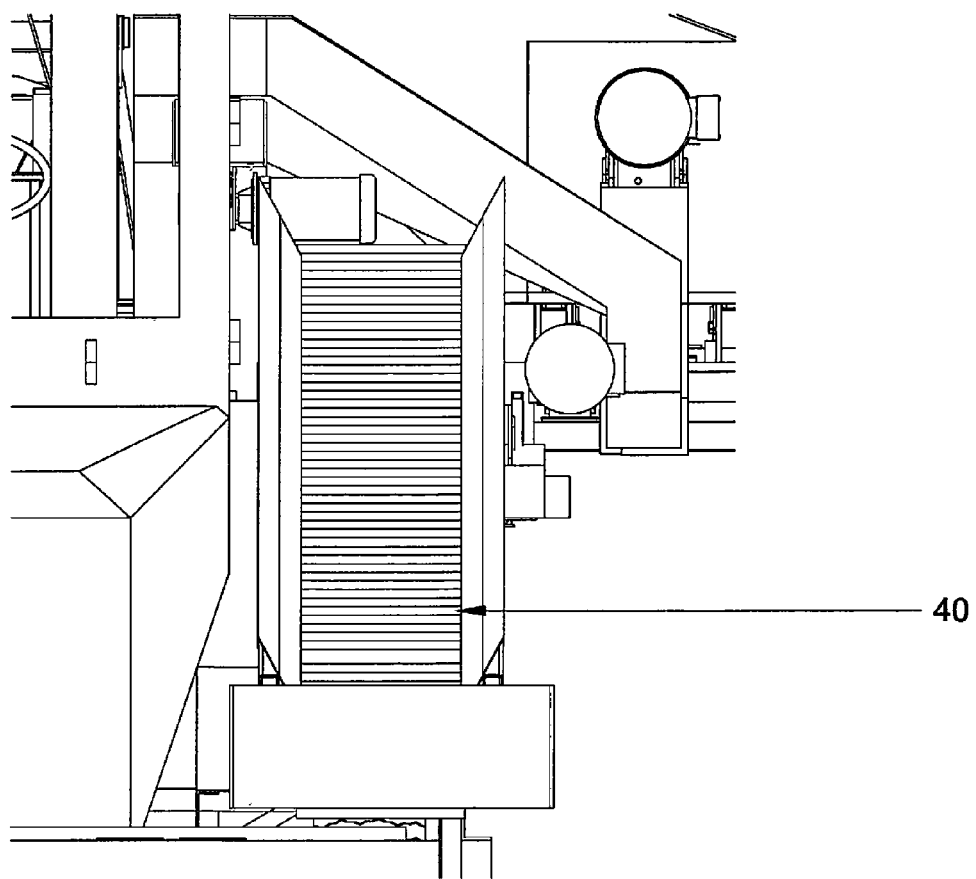
FIG. 4 illustrates a detail view of an example of an elevational conveyor, such as the one illustrated in the example in FIG. 1 oriented forward of a transverse conveyor system including bucket loaders.

FIG. 4 illustrates an alternative to a bucket loader arrangement, which may be used instead of, or in addition to, the bucket loader arrangement. An example of an elevational conveyor 40 is shown as one example of the elevational conveyor system 1 illustrated in FIG. 1. The conveyor rotates rollers using an electric motor operatively coupled to the conveyor, which moves vegetables up the inclined conveyor system.

Figure 5:
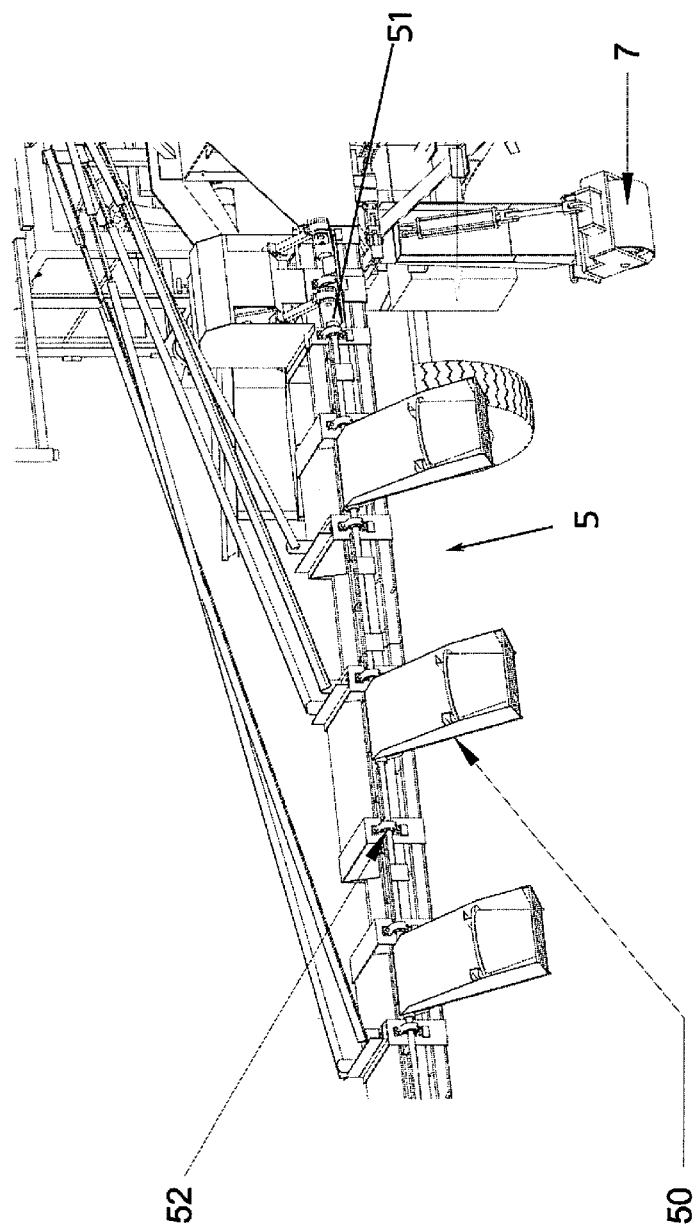
FIG. 5 illustrates a detail view of an example of a plurality of bucket loaders in a partially raised position on a transverse conveyor system disposed on the left side of a harvester.
Figure 6:
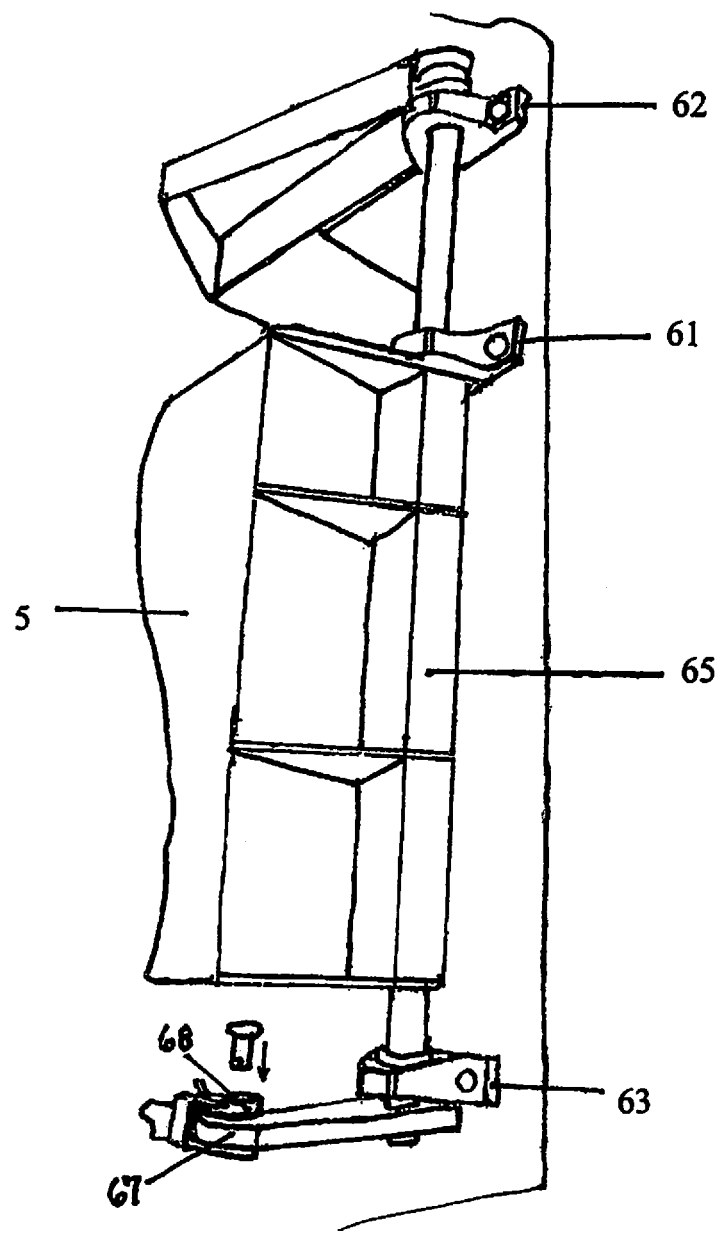
FIG. 6 illustrates a detail view of an example of a rotational attachment of a transverse conveyor system.

FIG. 5 illustrates a detail view of an example of a plurality of bucket loaders 50 in a partially raised position on a transverse conveyor system 5, such as the transverse conveyor 5 disposed on the left side of the harvester 1 in FIG. 1. A rotationally oscillating member 52 may engage a portion of the bucket loaders 50 during raising and lowering of the bucket loaders but may be disengaged from the bucket loaders 50 during a portion of its oscillatory rotation, for example. A drive with linkages 51 may transform a rotational motion in a single angular direction, such as the rotational motion of an electric motor, to the oscillatory motion of the rotationally oscillating mechanism 52 that raises and lowers the bucket loaders 50.

When not in use, a transverse conveyor 5 may be rotated to a storage position oriented alongside the longitudinal conveyor system, for example. A rotational attachment 65 may be mounted by bearings 61, 62, 63, for example, to the structural frame of the harvester 1. For example, a linear, pneumatic actuator 68 may be coupled with a lever arm 67 to rotational displace the transverse conveyor from its stored position during transit to its operational position during harvesting of vegetables.

Figure 7:
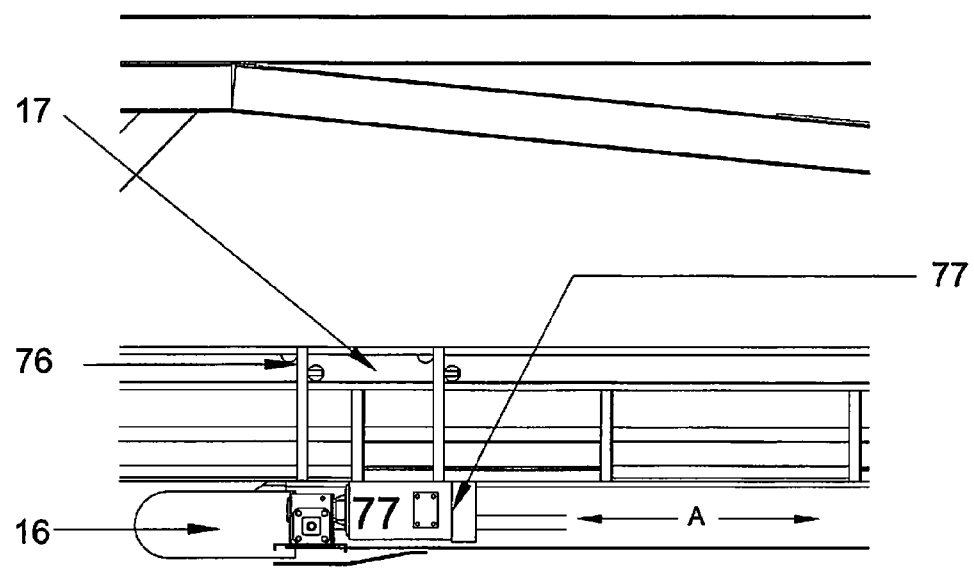
FIG. 7 illustrates a detail view of an example of a portion of a longitudinal conveyor system.

In one example, an electric motor 77 is operationally coupled to an extendable conveyor 16 operationally mounted to a longitudinal conveyor 17 of the harvester 1. For example, as illustrated in FIG. 7, the extendable conveyor 16 is mounted by a system of rollers 76 engaging a track provided by a side portion of the longitudinal conveyor 17. The operations center 14 may include controls capable of operatively engaging the electric motor 77 to translate the extendable conveyor 17 backward and forward as illustrated by the arrows A in FIG. 7.

Figure 8:
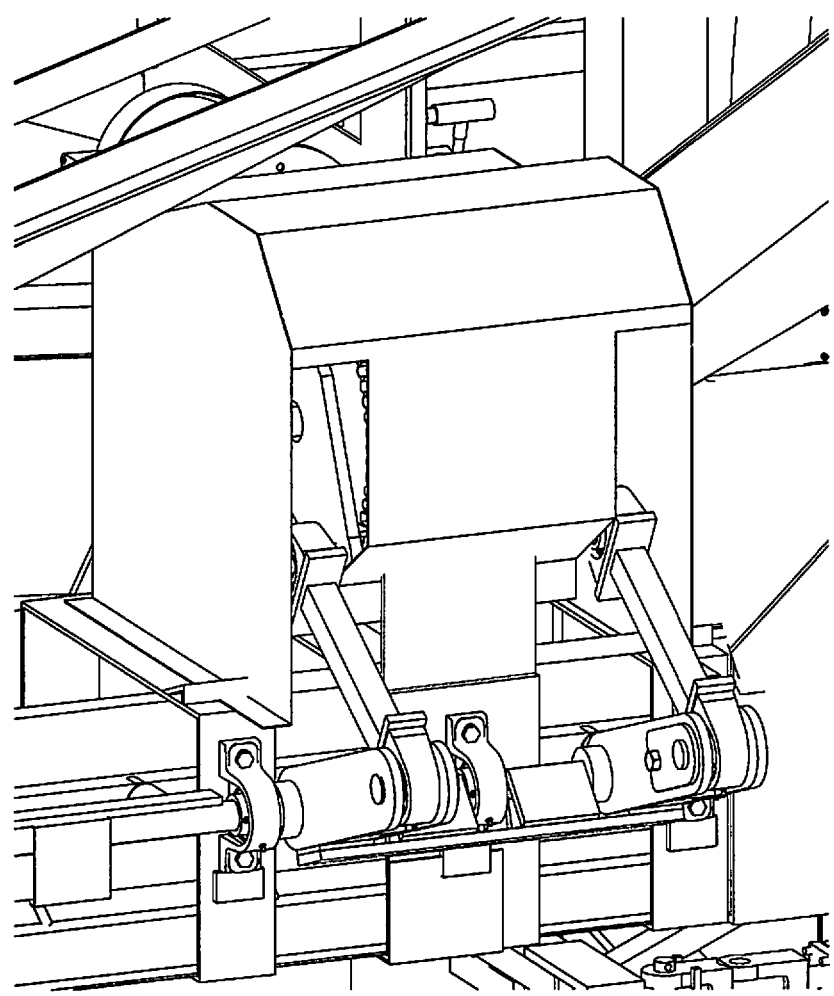
FIG. 8 illustrates a detail view of an example of a mechanism for raising and lowering a bucket loader.
Figure 10B:
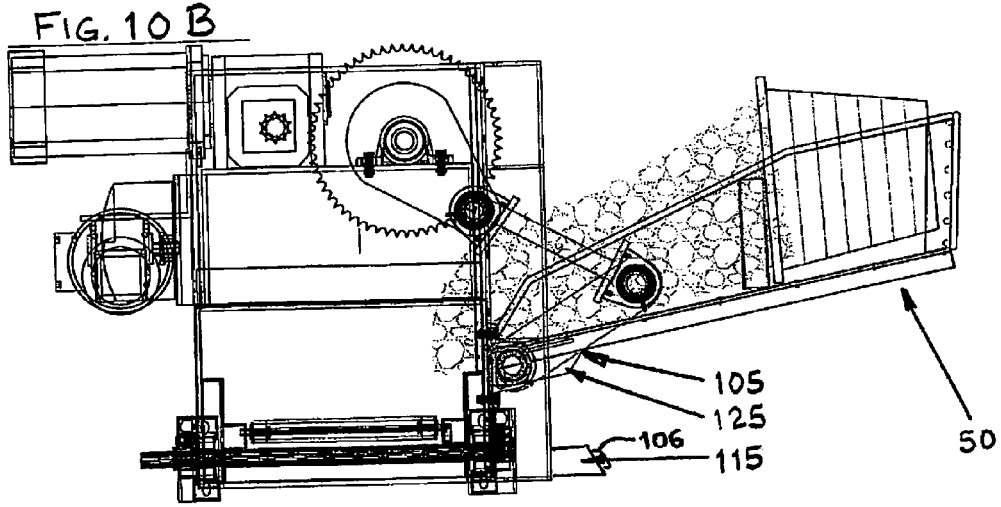
FIGS. 10A-B illustrate a side detail view of a mechanism for raising and lowering a bucket loader in relation to the bucket loader in (A) a lower position and (B) a raised position.
Figure 10A:
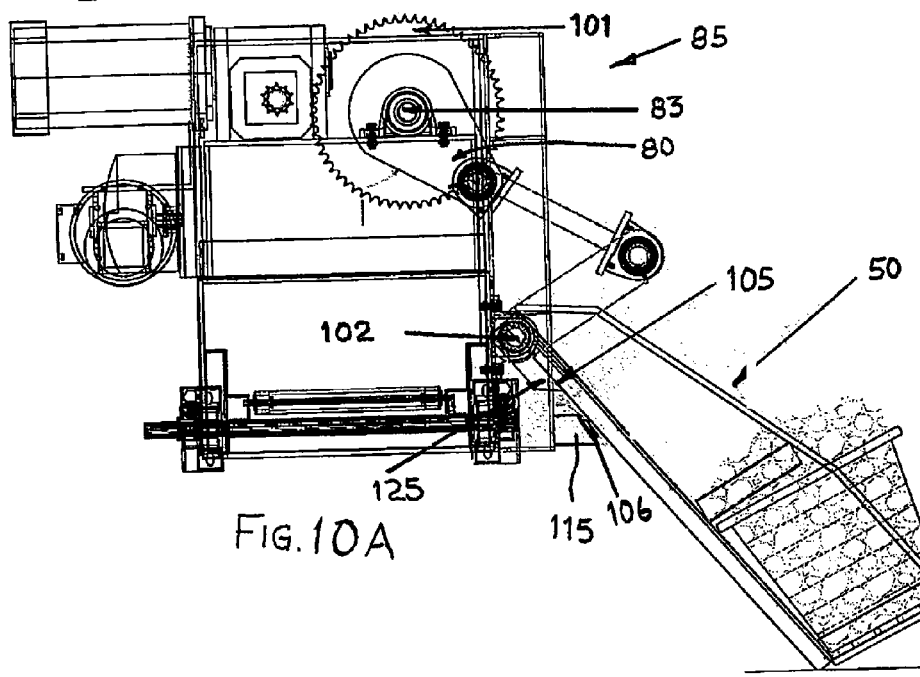

FIG. 8 illustrates a detail view of an example of a mechanism 85 for raising and lowering a bucket loader. For example, a first linkage 80 may be operatively rotated about a rotational axis 83 by a drive, such as an electric motor. The electric motor may be powered by a generator mounted on the harvester 1, such as a diesel, natural gas or gasoline powered generator, which may be driven by the main engine of the harvester or, preferably, by a separate electric generation system mounted on the harvester, in one example. As also shown in FIGS. 10A and 10B, the first linkage is pivotably coupled to a second linkage 82. The second linkage may be pivotably coupled to a third linkage 84, which may comprise a pair of lever arms, as illustrated in FIG. 8, for example. The lever arm or lever arms 84 may be welded, or otherwise joined, to a rotational shaft for delivering an oscillatory rotational motion to a plate 125. The plate 125 may continuously oscillate between a first rotational position and a second rotational position. In one example, the plate 125 is not connected to any of the plurality of bucket loaders 50. Instead, the plate, which may include a resilient material, such as a rubber or other elastic material, on a first surface 105 of the plate contacts the bucket loader 50 during only a portion of its oscillatory rotation. During the remainder of its oscillatory motion, the plate 125 does not contact the bucket loader 50. When the plate, or the resilient material on the first surface of the plate, makes contact with a portion of the bucket loader, such as a portion of the bucket loader near the rotational axis of the bucket loader 30 rotationally mounted to a transverse conveyor, the bucket loader is engaged by the plate and is raised and lowered by the plate during this portion of the plates rotationally oscillatory motion. In one example, the mechanism provides for raising and lowering of the bucket loader 30, With a pause during each cycle to place a bucket into the bucket loader or to remove a bucket from the bucket loader while the bucket loader 50 remains in contact with a limit stop structure 115 supporting the bucket loader when the bucket loader is not in contact with the plate 125 of the mechanism for raising and lowering the bucket loader.

Figure 9:
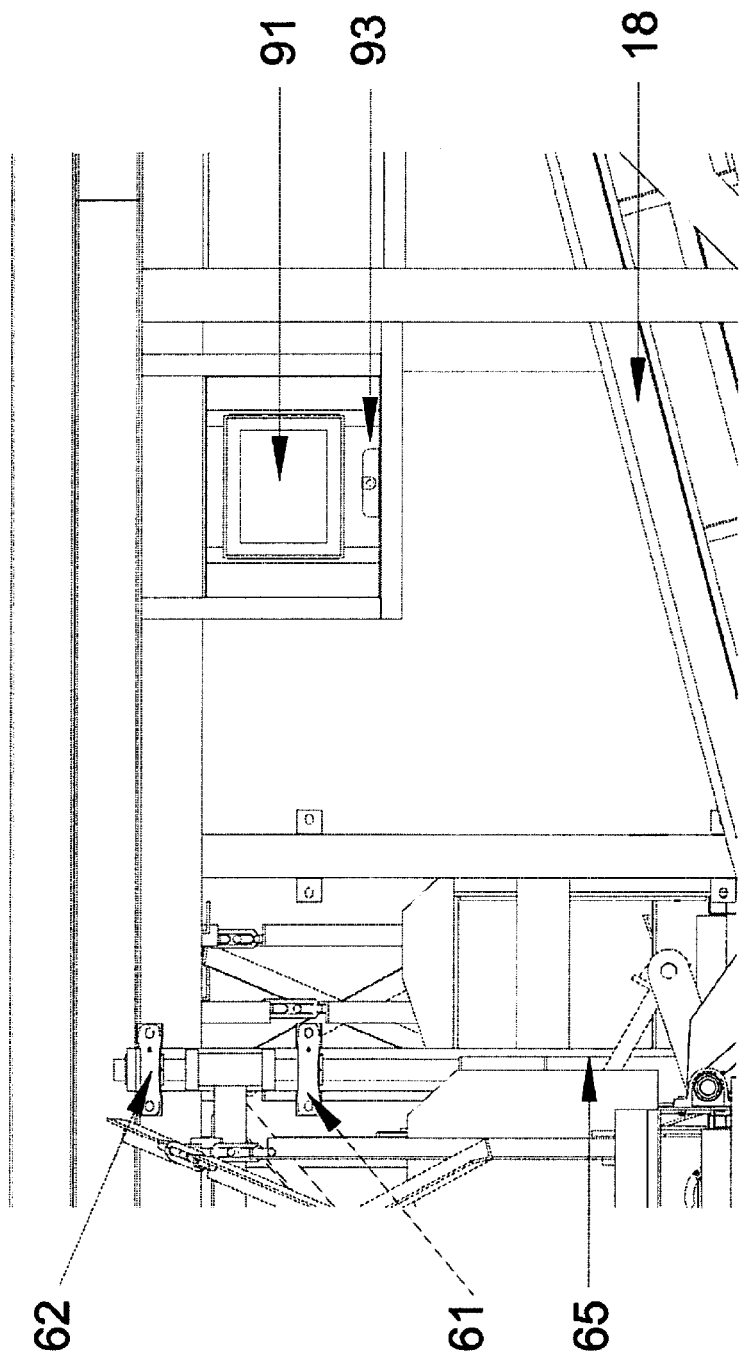
FIG. 9 illustrates a detail view of a monitor and camera system for monitoring, tracking and recording the harvester bucket loader and conveyor systems.

FIG. 9 illustrates a detail view of a monitor 91 and camera system 93 for monitoring, tracking and recording the harvester bucket loader and conveyor systems. The camera may be electrically coupled to a video display or displays within the operations center of the harvester, may be operatively coupled to a remote monitoring location or locations wirelessly and/or may be operatively coupled to a recording device or devices for recording all or a portion of the video feed from one or more cameras.

FIGS. 10A-10B illustrate a detail view of the mechanism for raising and lowering a bucket loader 50. A plate 125 or other member is attached to a rod or shaft 102 that is coupled operatively to an oscillatory drive mechanism 85 that drives the shaft 102 rotationally. The plate 125 contacts a surface of the bucket loader 50 at a contact region 105, which in one example is not joined to the plate 125, such that as the plate continues in a downward arc, the plate is no longer in contact with the contact region 105. Instead, a bumper 115, which may have a resilient pad, such as foam pad 106 on its surface, makes contact with a surface of the bucket loader 50 retaining the bucket loader 50 in a stationary position for a duration set by the rotational velocity of the shaft 102 and the angular distance that the plate 125 travels before the shaft 102 reverses its rotational direction imposed by the various linkages. For example, a gear or gears 101 provide a first linkage 80 with a rotational motion about a rotational axis 83. Thus, the bucket loader 50 stays at rest for a specified duration for loading and unloading of buckets. For example, a vegetable harvester for loading hand-picked vegetables onto a truck comprises a conveyor arm 3,5 having a conveyor belt for conveying the vegetables; a bucket loader 30, 50 pivotally coupled to the conveyor arm 3,5, such that the bucket loader 30, 50 freely pivots from a lowered position to a raised position, the raised position emptying the vegetables from the bucket loader onto the conveyor belt. A raising and lowering mechanism 85 may be coupled to the conveyor arm, the mechanism having a cycling contact arm 125 and during a portion of a cycle of the contact arm 125, when the contact arm 125 is in contact with the bucket loader 30, 50 then the contact arm raises the bucket loader to the raised position and lowers the bucket loader to the lowered position, and during another portion of the cycle of the contact arm 125, the bucket loader rests against a stop 115 in the lowered position and does not contact the contact arm 125. A longitudinal conveyor may be arranged at an angle to the conveyor arm and coupled to the conveyor arm, disposed transversely to the longitudinal conveyor, such that vegetables conveyed by the conveyor arm are transferred to the longitudinal conveyor for delivery to the truck.

In one example, the harvester includes a data collection system. The data collection system records the number of buckets of vegetables loaded on a bucket loader by a picker, as well as recording and displaying the picker's identification number and cumulative bucket counts. For example, three screens disposed on three sides of the harvester display the picker's id and bucket count, when the picker interacts with the data collection system, such as by swiping a card with a magnetic strip or RFID unit. A picture of the picker is taken each time the picker interacts with the data collection system and the bucket is overprinted with a date and time that the picker loads the bucket onto the bucket loader. A printer located at a centralized location, such as a cab of the harvester, prints the data and image, for example, providing a paper trail. At the end of a shift, an operator can print a report containing all of the pickers that day with their bucket counts, together with the trucks filled and the number of buckets that it took to fill each truck. In one example, the data and reports are transmitted, such as by a wireless transmitter, such as cellular, WiFi or other wireless transmitters and/or receivers. In addition to the data collection system, a GPS device may provide location and position data as part of the report, allowing the data collection system to determine and/or correlate, automatically, the field and other information related to the location for payroll and reporting purposes. In one example, an internet based camera system permits a viewer located in a remote location, such as an office, to monitor the operations of the harvester over a wireless connection with the camera and data collection system.

What is claimed is:

1. A vegetable harvester for loading hand-picked vegetables onto a truck, the harvester comprising:
   a conveyor arm having a conveyor belt for conveying the vegetables;
   a bucket loader pivotally coupled to the conveyor arm, such that the bucket loader freely pivots from a lowered position to a raised position, the raised position emptying the vegetables from the bucket loader onto the conveyor belt;
   a raising and lowering mechanism coupled to the conveyor arm, the mechanism having a cycling contact arm arranged to oscillate pivotally about an axis such that, during a portion of a cycle of the contact arm, when the contact arm is in contact with the bucket loader, then the contact arm raises the bucket loader to the raised position and lowers the bucket loader to the lowered position, and during another portion of the cycle of the contact arm, the bucket loader rests against a stop in the lowered position, and the contact arm continues to oscillate pivotally but does not make contact with the bucket loader for a period of time; and
   a longitudinal conveyor arranged transversely to the conveyor arm and coupled to the conveyor arm such that vegetables conveyed by the conveyor arm are transferred to the longitudinal conveyor for delivery to the truck.

2. The vegetable harvester of claim 1, wherein the mechanism pivotally rotates the contact arm in a first rotational direction, during raising of the bucket loader, and reverses the rotational direction of the contact arm, during lowering of the bucket loader.

3. The harvester of claim 2, wherein the stop includes a bumper.

4. The harvester of claim 3, wherein the bumper includes a resilient pad, such that the bucket loader contacts the resilient pad, when the bucket loader is in the lowered position.

5. The harvester of claim 3, wherein the contact arm of the mechanism is not in contact with any portion of the bucket loader during a loading delay period of the cycle of the contact arm, when the bucket loader remains at rest against the bumper, such that vegetables may be loaded onto the bucket loader, while the bucket loader remains at rest.

6. The harvester of claim 5, wherein the bucket loader is one of a plurality of bucket loaders and the contact arm is one of a plurality of contact arms, each of the bucket loaders being raised and lowered by a respective one of the plurality of contact arms, each of the plurality of contact arms being pivotally rotated by the raising and lowering mechanism of the harvester.

7. The harvester of claim 6, further comprising:
   a video monitoring system mounted on the harvester and arranged to monitor operation of the plurality of bucket loaders from a single monitoring station.

8. The harvester of claim 7, further comprising:
   a mobile chassis having a drive train and wheels such that the mobile chassis displaces the harvester over the ground from controls located at the single monitoring station.

9. The harvester of claim 8, further comprising:
   an electrical generator, wherein the electrical generator provides electric power to an electric drive that drives the raising and lowering mechanism.

10. The harvester of claim 9, further comprising:
a misting system comprising a fan and a mister, such that a cooling mist is produced and distributed in a region around the harvester, providing a more comfortable work environment.

11. The harvester of claim 1, further comprising:
a transfer pad, the transfer pad being made of a resilient material and being arranged at a transfer location where the vegetables are transferred from the bucket loader to the truck, such that at least some of the vegetables are transferred first to the transfer pad, reducing bruising or damage to the vegetables during the transfer.

12. The harvester of claim 1, further comprising:
a second conveyor arm coupled to the longitudinal conveyor at an angle to the longitudinal conveyor, the second conveyor arm extending from an opposite side of the longitudinal conveyor, such that the conveyor arm and the second conveyor arm extend from opposite sides of the longitudinal conveyor.

13. The harvester of claim 12, wherein the conveyor arm and the second conveyor arm are pivotably coupled to the harvester such that, when the plurality of bucket loaders are not operational, the conveyor arm and the second conveyor arm are both collapsible along a longitudinal direction of the longitudinal conveyor, such that the harvester may be driven along roadways.

14. The harvester of claim 13, wherein a single pin is used to secure the conveyor arm in either its operational configuration, extending outwardly from the longitudinal direction of the longitudinal conveyor, or in its collapsible configuration for transport along roadways.

15. The harvester of claim 12, further comprising:
an elevational conveyor extending in a direction forward of the mobile chassis for raising vegetables from a first level to a second level higher than the first level using the elevational conveyor, and the second end of the elevational conveyor coupling with the longitudinal conveyor such that vegetables raised by the elevational conveyor are directed onto the longitudinal conveyor for delivery to the truck.

16. The harvester of claim 1, wherein the longitudinal conveyor includes a plurality of segments coupled to each other and arranged, such that the length of the longitudinal conveyor may be extended or shortened by displacing one of the plurality of segments in relation to another of the plurality of segments.

17. The harvester of claim 16, wherein an end of a distal segment of the plurality of segments empties vegetables into the truck, and a control mechanism is coupled to the longitudinal conveyor and the control mechanism controls displacement of the end of the distal segment such that position that vegetables empty into the truck is adjustable using the control mechanism.

18. A vegetable harvester for loading hand-picked vegetables onto a truck, the harvester comprising:
a conveyor arm having a conveyor belt for conveying the vegetables;
a bucket loader pivotably coupled to the conveyor arm, such that the bucket loader freely pivots from a lowered position to a raised position, the raised position emptying the vegetables from the bucket loader onto the conveyor belt;
a transfer pad, the transfer pad being made of a resilient material and being arranged at a transfer location where the vegetables are transferred from the bucket loader to the truck, such that at least some of the vegetables are transferred first to the transfer pad, reducing bruising or damage to the vegetables during the transfer;
a raising and lowering mechanism coupled to the conveyor arm, the mechanism having a cycling contact arm, and during a portion of a cycle of the contact arm, when the contact arm is in contact with the bucket loader, then the contact arm raises the bucket loader to the raised position and lowers the bucket loader to the lowered position, and during another portion of the cycle of the contact arm, the bucket loader rests against a stop in the lowered position, wherein the mechanism pivotally rotates the contact arm in a first rotational direction, during raising of the bucket loader, and reverses the rotational direction of the contact arm, during lowering of the bucket loader, and the contact arm of the mechanism is not in contact with any portion of the bucket loader during a loading delay period of the cycle of the contact arm;
wherein the bucket loader is one of a plurality of bucket loaders and the contact arm is one of a plurality of contact arms, each of the bucket loaders being raised and lowered by a respective one of the plurality of contact arms, each of the plurality of contact arms being pivotably rotated by the raising and lowering mechanism of the harvester;
a longitudinal conveyor arranged at an angle to the conveyor arm and coupled to the conveyor arm such that vegetables conveyed by the conveyor arm are transferred to the longitudinal conveyor for delivery to the truck, the longitudinal conveyor includes a plurality of segments coupled to each other and arranged, such that the length of the longitudinal conveyor may be extended or shortened by displacing one of the plurality of segments in relation to another of the plurality of segments, and wherein the conveyor arm is pivotably coupled to the harvester such that, when the plurality of bucket loaders are not operational the conveyor arm is collapsible along a longitudinal direction of the longitudinal conveyor, such that the harvester may be driven along roadways;
an electrical generator, wherein the electrical generator provides electric power to an electric drive that drives the raising and lowering mechanism; and
a recording device capable of recording the number of buckets of vegetables picked and loaded by a worker using the harvester.

19. A method of processing and packing vegetables using the harvester of claim 1, comprising:
placing vegetables on the bucket loader of the harvester;
raising the bucket loader by operating the raising and lowering mechanism including
rotating the contact arm such that the contact arm of the mechanism contacts the bucket loader and raises the bucket loader;
emptying the vegetables from the bucket loader onto the conveyor belt of the conveyor arm;
continuing operation of the raising and lowering mechanism such that the raising and lowering mechanism reverses the rotational direction of the contact arm, lowering the bucket loader to the lowered position, again;
disengaging the contact arm from contact with the bucket loader; and
delaying a following cycle of raising the bucket loader for a delay period; and
transferring the vegetables from the conveyor arm to the longitudinal conveyor such that vegetables conveyed by the conveyor arm are transferred to the longitudinal conveyor and delivered to the truck.

20. The method of claim 19, further comprising:
employing an interactive data collection system, wherein a picker interacts with the interactive data collection system, such that the interactive data collection system records a cumulative number of buckets of vegetables loaded on the bucket loader by the picker, the picker's identification information, and a picture of the picker taken at the time that the picker interacts with the data collection system;
displaying to the picker, the picker's identification information and a cumulative bucket count when the picker interacts with the data collection system; and
reporting the data to a payroll processing system.

21. The method of claim 20, wherein the step of reporting includes wirelessly transmitting data collected by the data collection system in the field to the payroll processing system.

* * * * *